United States Patent
Potter et al.

(10) Patent No.: US 6,722,521 B2
(45) Date of Patent: Apr. 20, 2004

(54) LOW PERMEATION PINCHOFF CONNECTION FOR BRIDGING A BARRIER LAYER AND METHOD OF MAKING SAME

(75) Inventors: James Fuller Potter, Livonia, MI (US); Erich James Vorenkamp, Pinckney, MI (US); Duane Allen Fish, Fenton, MI (US); Link Eugene Vaughn, Canton, MI (US); Huan-Kun Chang, Sylvania, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 79 days.

(21) Appl. No.: 10/140,626

(22) Filed: May 7, 2002

(65) Prior Publication Data

US 2003/0209550 A1 Nov. 13, 2003

(51) Int. Cl.[7] ................................ B65D 33/00
(52) U.S. Cl. .................... 220/562; 220/4.14; 220/62.22
(58) Field of Search ................ 220/502, 4.14, 220/564, 62.22, 62.11, 586

(56) References Cited

U.S. PATENT DOCUMENTS

| 2,439,562 A | * | 4/1948 | Cunningham | .......... 220/560.02 |
|---|---|---|---|---|
| 3,115,987 A | | 12/1963 | Barnstead | |

(List continued on next page.)

FOREIGN PATENT DOCUMENTS

| EP | 0 448 329 A1 | 3/1991 |
|---|---|---|
| EP | 0 930 190 A2 | 7/1999 |
| EP | 0 930 190 A3 | 3/2000 |
| EP | 1 031 725 A2 | 8/2000 |
| EP | 1 031 725 A3 | 5/2001 |
| EP | 1 108 598 A2 | 6/2001 |
| EP | 1 108 599 A2 | 6/2001 |
| EP | 1 285 746 A1 | 2/2003 |
| EP | 1 108 596 A3 | 10/2003 |

OTHER PUBLICATIONS

PCT Publication, WO 01/62535, Aug. 30, 2001, WIPO.
PCT Publication, WO 01/42692, Jun. 14, 2001, WIPO.

*Primary Examiner*—Joseph Man-Fu Moy
(74) *Attorney, Agent, or Firm*—Brinks Hofer Gilson & Lione

(57) ABSTRACT

The present invention involves a low permeation pinchoff connection at a pinchoff region having a pinchoff end between first and second formed sheets of a fluid tank. The low permeation pinchoff connection comprises a continuous inner polymeric layer at a pinchoff region having a pinchoff end between the first and second formed sheets. The connection further comprises an outer polymeric layer in side-by-side relationship with the continuous inner polymeric layer. The outer polymeric layer tapers at the pinchoff region to first and second outer polymeric ends at the pinchoff end separating the first and second outer polymeric ends. The connection further comprises a low permeation barrier layer disposed between the continuous inner polymeric layer and the outer polymeric layer. The low permeation barrier layer tapers with the outer polymeric layer at the pinchoff region to first and second barrier ends separated at the pinchoff end to determine a pinchoff gap. The low permeation barrier layer is exposed at the pinchoff end. The connection further includes a first adhesive layer disposed between the continuous inner polymeric layer and the low permeation barrier layer, and a second adhesive layer disposed between the low permeation barrier layer and the outer polymeric layer. The connection further comprises a barrier bridge disposed on the pinchoff end to bridge the pinchoff gap. The barrier bridge has material compatible with low permeation barrier layer to connect the first and second barrier ends for continuity therebetween.

20 Claims, 3 Drawing Sheets

U.S. PATENT DOCUMENTS

| | | |
|---|---|---|
| 3,426,937 A | 2/1969 | Boschi et al. |
| 3,606,958 A | 9/1971 | Coffman |
| 3,779,420 A | 12/1973 | Knaus |
| 3,811,173 A | 5/1974 | Baumann |
| 3,912,107 A | 10/1975 | Baumann |
| 4,513,906 A | 4/1985 | Chang et al. |
| 4,753,368 A | 6/1988 | Lescaut |
| 4,962,862 A | 10/1990 | Farrington et al. |
| 5,129,544 A | 7/1992 | Jacobson et al. |
| 5,230,935 A | 7/1993 | Delimoy et al. |
| 5,398,839 A * | 3/1995 | Kleyn .................. 220/560.03 |
| 5,443,874 A | 8/1995 | Tachi et al. |
| 5,547,096 A * | 8/1996 | Kleyn ....................... 220/4.14 |
| 5,582,729 A | 12/1996 | Shioda et al. |
| 5,691,016 A | 11/1997 | Hobbs |
| 5,766,713 A | 6/1998 | Ravishankar et al. |
| 6,033,749 A | 3/2000 | Hata et al. |
| 6,044,999 A | 4/2000 | Kido |
| 6,179,145 B1 | 1/2001 | Roth |
| 6,189,716 B1 | 2/2001 | Lawrukovich et al. |
| 6,409,040 B1 * | 6/2002 | Distelhoff et al. .......... 220/562 |
| 6,491,180 B2 * | 12/2002 | Distelhoff et al. .......... 220/562 |
| 2001/0025666 A1 | 10/2001 | Brown et al. |
| 2001/0029994 A1 | 10/2001 | Brown et al. |

\* cited by examiner

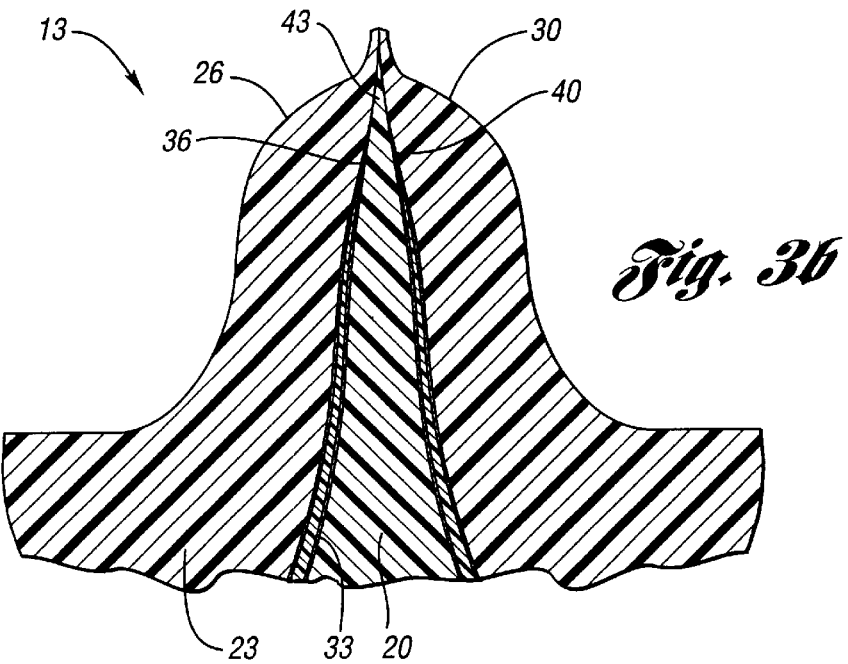

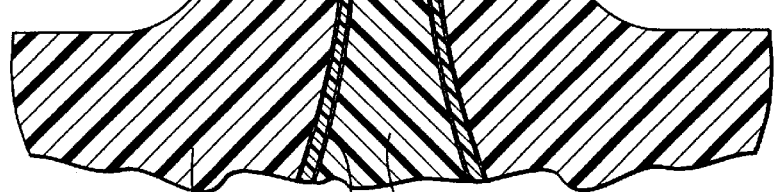

```
┌─────────────────────────────────────────────────────┐
│ REMOVING EXCESS MATERIAL FROM THE PINCHOFF END      │──112
└─────────────────────────────────────────────────────┘
                        ↓
┌─────────────────────────────────────────────────────┐
│ SURFACE TREATING THE FLUID TANK AT THE PINCHOFF END │──114
└─────────────────────────────────────────────────────┘
                        ↓
┌─────────────────────────────────────────────────────┐
│ ADHERING A LOW PERMEATION BARRIER BRIDGE            │──116
│ TO THE PINCHOFF END TO BRIDGE THE PINCHOFF GAP      │
└─────────────────────────────────────────────────────┘
```

LOW PERMEATION PINCHOFF CONNECTION FOR BRIDGING A BARRIER LAYER AND METHOD OF MAKING SAME

BACKGROUND OF THE INVENTION

The present invention relates to a low permeation pinchoff connection and a method of bridging a low permeation barrier layer at a pinchoff end of a fluid tank for reducing permeation of gaseous fluids through the fluid tank.

Fluid tanks are common in several industries. For example, fuel tanks for motorized vehicles have been used for many years. Many of the current fuel tanks installed in motorized vehicles are made of plastic or metal. Plastic storage containers provide a number of advantages over those made of other materials. Some advantages include reduced weight, reduced cost for both materials and construction, and greater flexibility and shape. Along with these advantages, the ability of certain plastic containers to stretch or flex makes them useful in automotive applications. A problem in plastic tanks that manufacturers have experienced is fuel may permeate through the walls of the plastic tank. For example, monolayer polyethylene fuel tanks, while benefiting from the advantages mentioned above, suffer from a relatively high permeability to gasoline with respect to containers formed of other materials.

Several approaches have been taken to improve the permeability characteristics of plastic fuel containers or tanks. One solution to this problem has been a fuel tank formed of a multi-layer wall material that is composed of layers of polyethylene and an ethylene-vinyl alcohol copolymer (EVOH). The EVOH copolymer exhibits good gasoline vapor barrier properties.

Polyethylene-EVOH thermoplastics structures can be formed into a variety of container shapes using twin-sheet thermo-forming and blow molding techniques. Polyethylene-EVOH container walls typically have about five to seven layers. The five layers include polyethylene inner and outer layers and one EVOH layer with an adhesive layer on each side. Regardless of the forming process, there are areas on the fuel tank known as the pinchoff where opposing multilayer structures are "pinched" together, e.g., to rejoin sheets in the case of thermoforming, or to rejoin parisons in the case of blow molding. This forms a continuous container. In a pinchoff region or area where the multilayer structures are brought together, typically two EVOH barrier layers from opposing walls are not able to re-bond to a continuous state. The resultant pinchoff area has a higher permeation rate than other portions of the container.

BRIEF SUMMARY OF THE INVENTION

The present invention provides a low permeation pinchoff connection between first and second formed multilayer walls or sheets of a fluid tank for reducing permeation of gaseous fluids therefrom. The low permeation pinchoff connection seals a barrier layer of the fluid tank to reduce gaseous permeation therefrom. This is accomplished by bridging barrier ends of a low permeation barrier layer on a pinchoff end of a pinchoff region of the fluid tank. More specifically, a barrier bridge is disposed on the pinchoff end to bridge a pinchoff gap within which the barrier ends are separated. This provides continuity between the barrier ends and reduces gaseous permeation therethrough.

Further aspects, features and advantages of the invention will become apparent from consideration of the following the detailed description and the appended claims when taken in connection with the accompanying drawings.

BRIEF DESCRIPTION OF THE DRAWINGS

FIG. 2a is a cross sectional view of a tank wall of the fluid tank in FIG. 1 taken along lines 2a—2a;

FIG. 3b is an enlarged view of the pinchoff region shown in circle 3b of FIG. 3a;

FIG. 4b is an enlarged view of the pinchoff region in circle 4b of FIG. 4a in accordance with the present invention;

FIG. 7 is a flow chart of a general method of bridging a low permeation barrier layer at a pinchoff end of a fluid tank in accordance with the present invention.

DETAILED DESCRIPTION OF THE INVENTION

Figure 1:
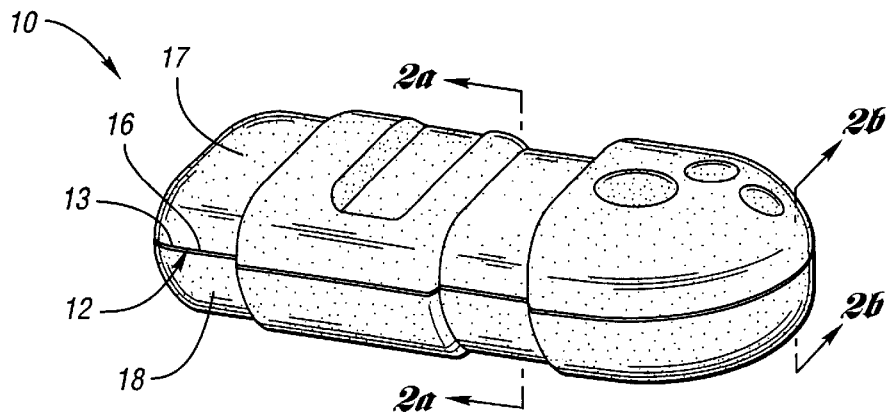
FIG. 1a is a perspective view of a fluid tank having a low permeation pinchoff connection in accordance with the present invention.

FIG. 1 illustrates a fuel or fluid tank 10 having a low permeation pinchoff connection 12 for reducing permeability through the fluid tank in accordance with the present invention. The low permeation pinchoff connection 12 includes a pinchoff region 13 having a pinchoff end 16 between first and second sections or sheets 17, 18. In this embodiment, fluid tank 10 is a fuel tank for motor vehicles.

Figure 2A:
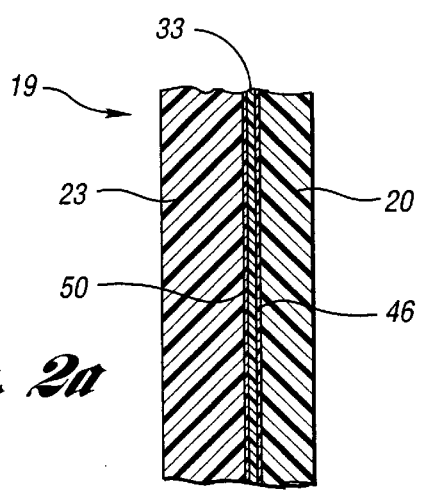

As shown in FIG. 2a, fluid tank 10 is formed of a multi-layer wall 19 having materials that are composed of layers of polyethylene and an ethylene-vinyl alcohol (EVOH) co-polymer. In this embodiment, the multi-layer wall 19 is a polyethylene-EVOH wall having five layers. Of course, the multi-layer wall of the fluid tank may include more or less than five layers without falling beyond the scope or spirit of the present invention. The EVOH co-polymer has been found to provide effective hydrocarbon vapor barrier properties. Fuel tank 10 may be formed using twin-sheet thermo-forming and blow molding techniques. Of course, other suitable ways in forming fluid tank may be used without falling beyond the scope or spirit of the present invention.

As shown in FIG. 2a, multi-layer 19 includes a continuous inner polymeric layer 20. Continuous inner polymeric layer 20 is preferably made of high density polyethylene (HDPE). Inner polymeric layer 20 may also include carbon black compounded with the HDPE therein. Of course, continuous inner polymeric layer 20 may be made of any other suitable materials known in the art.

As shown, an outer polymeric layer 23 is placed in overlying relationship with the continuous inner polymeric layer 20. The outer polymeric layer 23 is spaced apart from inner polymeric layer 20 as will be described in greater detail below. In this embodiment, the outer polymeric layer 23 is made of HDPE and may also include carbon black compounded with the HDPE therein. Of course, the outer polymeric layer 23 may be made of any other suitable materials.

Multi-layer wall 19 further includes a low permeation barrier layer 33 disposed between the continuous inner polymeric layer 20 and the outer polymeric layer 23. The low permeation barrier layer 33 is a thin EVOH co-polymer layer which provides a low permeation barrier to reduce gaseous fluid permeation through fuel tank 10, since it has been found that EVOH reduces hydrocarbon permeation through fuel tank 10. The low permeation barrier layer 33 may include any suitable barrier material including ethylene vinyl alcohol, nylon, polyvinylidene chloride, polyvinylidene fluoride, and abcite.

As shown in FIG. 2a, the multi-layer wall 19 further includes a first adhesive layer disposed between the continuous inner polymeric layer 20 and the low permeation barrier layer 33. In this embodiment, the first adhesive layer 46 is a low density polyethylene (LDPE), such as an ethylene-α-maleic anhydride co-polymer. This bonds the low permeation barrier layer 33 to the continuous inner polymeric layer 20.

Moreover, a second adhesive layer 50 is disposed between the low permeation barrier layer 33 and the outer polymeric layer 23. In this embodiment, the second adhesive layer is also made of LDPE such as ethylene-α-maleic anhydride co-polymer. This bonds the low permeation barrier layer 33 to the outer polymeric layer 23. Thus, the low permeation barrier layer 33, the first adhesive layer 46 and the second adhesive layer 50 are disposed in the space between the inner polymeric layer 20 and the outer polymeric layer 23.

Figure 2B:
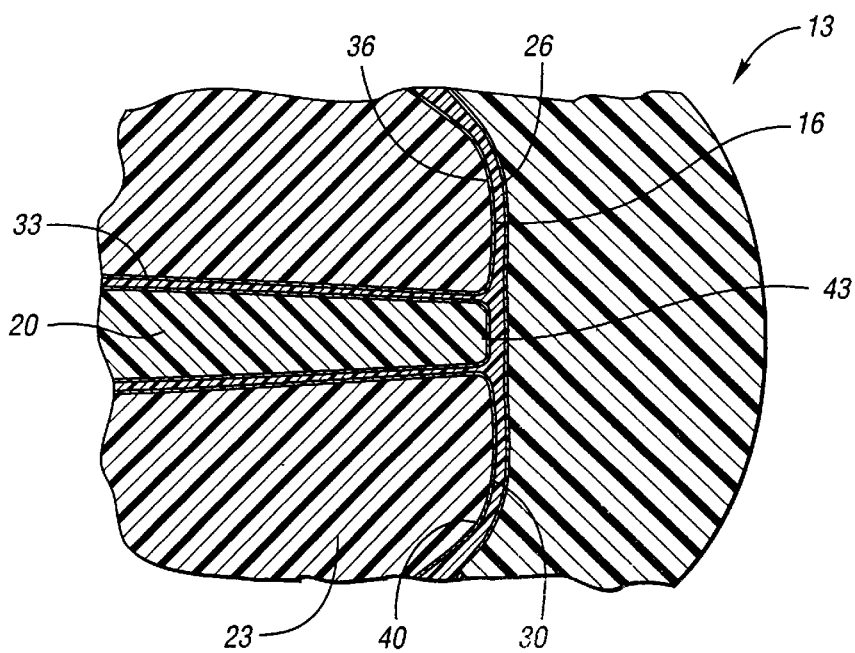
FIG. 2b is a cross sectional view of a pinchoff region of the fluid tank in FIG. 1 taken along lines 2b—2b.
Figure 3A:
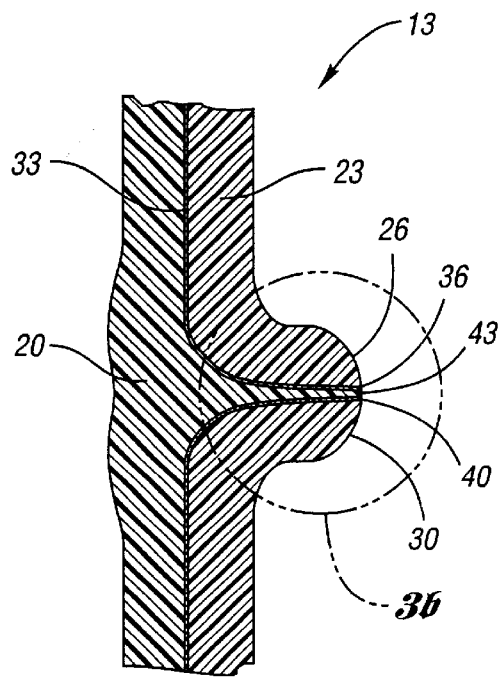
FIG. 3a is a side cross sectional view of the pinchoff region of the fluid tank in FIG. 1.

As shown in FIGS. 2b and 3a, low permeation pinchoff connection 12 includes pinchoff region 13 having pinchoff end 16. Pinchoff region 13 is formed during formation of the fluid tank 10 and protrudes or extends from the multi-layer wall 19 to fuse sheets 17 and 18. As shown in FIGS. 1 and 3b, first and second formed sheets 17, 18 are pinched or fused together to define pinchoff region 13 to define a shape of fluid tank 10.

As shown in FIGS. 1, 3a–b, and 4a–b, low permeation pinchoff connection 12 includes the continuous inner polymeric layer 20 at the pinchoff region 13 between first and second formed sheets 17, 18. The continuous inner polymeric layer 20 is outwardly tapered at the pinchoff region 13 as a result of a thermoforming or blow molding process, for example, during formation of sheets 17 and 18 to define the shape of fluid tank 10.

Figure 4A:
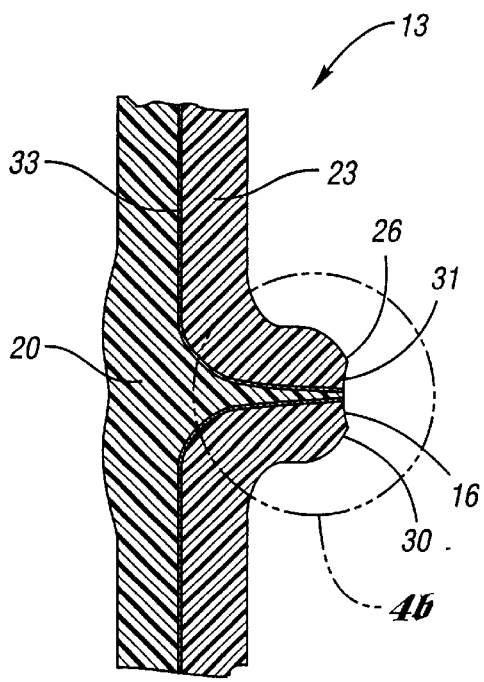
FIG. 4a is a side cross sectional view of the pinchoff region after a step of removing excess material in accordance with the present invention.

As shown in FIGS. 4a–b, low permeation pinchoff connection 12 further includes the outer polymeric layer 23 which is spaced apart and in overlying relationship with the continuous inner polymeric layer 20. As shown, the outer polymeric layer 23 tapers with the continuous inner polymeric layer 20 at the pinchoff region 13 to first and second outer polymeric ends 26, 30 at the pinchoff end 16.

In FIGS. 4a and 4b, low permeation pinchoff connection 12 further includes the low permeation barrier layer 33 between the continuous inner polymeric layer 20 and the outer polymeric layer 23. The low permeation barrier layer 33 tapers with the outer polymeric layer 23 at the pinchoff region 13 to first and second barrier ends 36, 40. The first and second barrier ends 36, 40 are separated at the pinchoff end 16. This defines a pinchoff gap 43 within which the first and second barrier ends 36, 40 are separated. As will be described in greater detail below, the low permeation barrier layer 33 is exposed at the pinchoff end 16 so that the first and second barrier ends 36, 40 may be bridged with a barrier substrate or barrier bridge adhering to the pinchoff end.

In this embodiment and in FIG. 4a, the pinchoff end 16 is recessed to form a notch 31 thereon. Notch 31 allows the low permeation barrier layer 33 to more easily be exposed at the pinchoff end 16. However, it is to be understood that the notch 31 is only preferred and not necessary.

Figure 5:
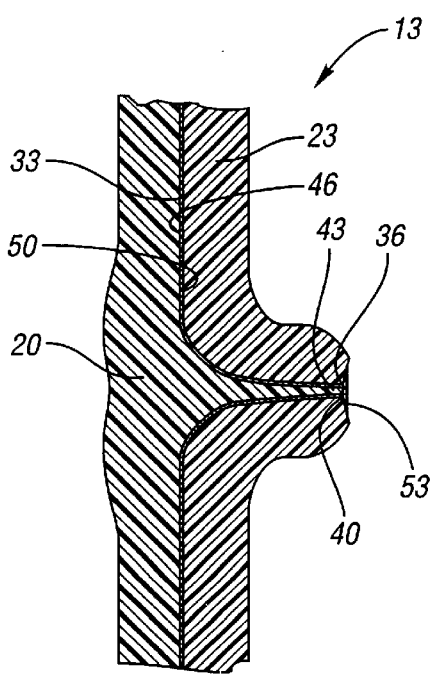
FIG. 5 is a side cross sectional view of the pinchoff region having a barrier bridge in accordance with the present invention.

As shown in FIG. 5, the pinchoff region 13 further includes the first and second adhesive layers 46, 50 outwardly tapering from the multi-layer wall 19. As shown, the first adhesive layer 46 is between the continuous inner polymeric layer 20 and the low permeation barrier layer 33. As shown, the second adhesive layer 50 is between the low permeation barrier layer 33 and the outer polymeric layer 23.

In FIG. 5, low permeation pinchoff connection 12 further includes a barrier bridge 53 which is disposed on the pinchoff end 16 to bridge the pinchoff gap 43. The barrier bridge 53 has material which is compatible with the low permeation barrier layer 33 to connect the first and second barrier ends 36, 40 for continuity therebetween. The barrier bridge 53 allows the low permeation barrier layer to be continuous between the first formed sheet 17 and the second formed sheet 18. It has been found that the low permeation pinchoff connection 12 substantially reduces permeation of gaseous fluids through the fluid tank 10. In this embodiment, the barrier bridge may include any suitable barrier material including ethylene vinyl alcohol, nylon, polyvinylidene chloride, polyvinylidene fluoride, abcite, or any other barrier material compatible with the low permeation barrier layer 33.

Figure 6:
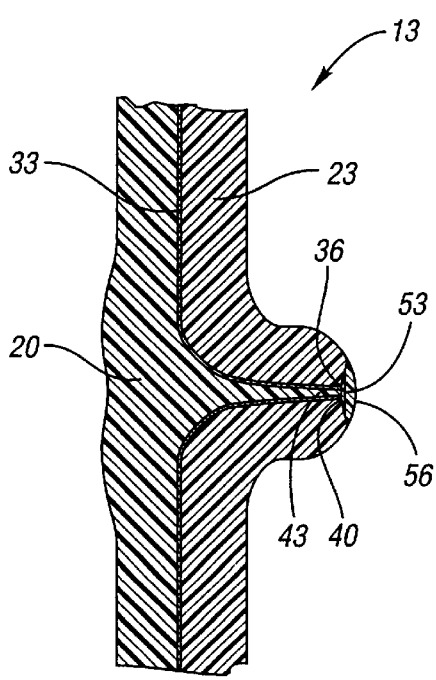
FIG. 6 is a side cross sectional view of the pinchoff region depicting a protective coat over the barrier bridge.

As shown in FIG. 6, low permeation pinchoff connection 12 may also include a protective coat 56 disposed on the pinchoff end 16 and over the barrier bridge 53. This provides protection of the barrier bridge 53 from external forces such as moisture, abrasion, and/or mechanical shock. The protective coat 56 may be made of high density polymer, such as high density polyethylene or any other suitable material.

FIG. 7 illustrates a flow chart of a general method of bridging a low permeation barrier layer at a pinchoff end of a fluid tank such as the fluid tank mentioned above in accordance with the present invention. As described above, the fluid tank has a pinchoff region between the first and second sheets to form the fluid tank. The pinchoff region has a low permeation barrier layer disposed between a continuous inner polymeric layer and an outer polymeric layer. The low permeation barrier layer tapers with the outer polymeric layer at a pinchoff end to first and second barrier ends. The first and second barrier ends are separated at the pinchoff end to define a pinchoff gap. As shown in FIG. 3b, method 110 comprises removing excess material from the pinchoff end to expose the first and second barrier ends at the pinchoff end in box 112.

In this embodiment, the step of removing excess material or flash from the pinchoff end may be termed "pre-trimming" of the pinchoff end. This may include machining or trimming the pinchoff end with suitable trimming devices to remove flash therefrom. In this embodiment, this forms a recessed notch as mentioned above and shown in FIG. 4a. Machining or trimming the pinchoff end allows the first and second barrier ends of the low permeation barrier layer to be exposed at the pinchoff end. As shown in FIGS. 4a and 4b, the first and second barrier ends are pinched close to each other but typically do not engage, defining a pinchoff gap mentioned above. It has been found that the pinchoff gap is an exit for vapor or gaseous fluid permeation through the fuel tank.

Method 110 further includes surface treating the fluid tank at the pinchoff end to promote surface adhesion thereto in box 114. The step of surface treating transforms the surface at the pinchoff end into an adherable substrate since polymer or polyolefin materials typically are not easily adhered to, sealed, printed on, gasketted, or wetted for post-molding, finishing, decorating, and other operations. Although not wanting to be limited on theory, the cause of such difficulties may be traced to low material surface energy, a material property similar to surface tensions of liquids. Typically, a pretreatment or surface treatment process causes a chemical change in the surface structure of polymers or polyolefins. Such chemical change may be termed ionization which increases surface energy and promotes adhesion of other surfaces thereto.

A number of surface treatments may be performed on the fluid tank at the pinchoff end to promote surface adhesion thereto. For example, an electrical surface treatment may be performed on the fluid tank at the pinchoff end to increase surface energy of or ionize the fluid tank at the pinchoff end for promoting surface adhesion thereto. At atmospheric pressure, a corona treatment is performed on the fluid tank to provide electrical discharges thereto as known in the art.

Another means of surface treating may include an air-blown arc plasma treatment wherein an air-blown arc plasma treater provides an electric arc which is established between two electrodes. As known in the art, a fan blows air through the arc and produces a plume of plasma, directed toward the treated surface.

Moreover, a high frequency arc treatment uses a high frequency arc treater and a suppressed spark treater. As known, such treatment uses power generators and high voltage transformers to produce discharge between two electrodes located on opposite sides of the treated surface. Particles pass between the electrodes and their surfaces are exposed to the discharge and receive treatment in the surrounding plasma. The treaters generate ozone during the operation which is exhausted or recirculated through ozone filters.

Method 110 further includes adhering a low permeation barrier bridge to the pinchoff end to bridge the pinchoff gap defining a continuous barrier layer in box 116. As mentioned above, the low permeation barrier bridge has material which adheres to the low permeation layer to connect the first and second barrier ends for continuity therebetween. This allows the fluid tank to be continuous between the first and second formed sheets mentioned above.

The step of adhering the low permeation barrier bridge to the pinchoff end may be performed by various means. For example, the low permeation barrier bridge may be adhered to the pinchoff end by a high velocity impact fusion (HVIF) method. The HVIF application ignites a propylene-oxygen mixture in a combustion chamber to produce heat, melt powdered resins inflight, and impart surface heat to the tank between about 150° and 300° Fahrenheit (F). This can be used to create notches at the pinchoff end shown in FIG. 4a. Barrier particles are introduced and deposited to the pinchoff end and the surrounding tank surface. This creates a material wall and a barrier bridge. This melts the particles in flight. The particles are exited from the chamber by way of a nozzle or heat gun and applied on the pinchoff end at speeds of about 250 feet per second (ft/s) to 740 ft/s, due to the combustion. Then, the fluid tank is cooled at ambient conditions to allow the low permeation barrier bridge to substantially adhere to the pinchoff end.

It has been found that the HVIF application of applying the barrier bridge particles on the first and second barrier ends and the pinchoff end reduces gas bubbles which may otherwise have formed therebetween. As mentioned above, the first and second barrier ends are bridged together forming a continuous barrier layer between the first and second formed sheets of the fluid tank. This provides a reduced permeation of hydrocarbons or gaseous fluids through the fluid tank.

Another way of adhering the low permeation barrier bridge to the pinchoff end may also include a method of a polyvinylidene chloride dip or spray application on the pinchoff end of the fluid tank. The polyvinylidene chloride solution preferably has about 10 to 30% by weight polyvinylidene chloride. The solvent used may include any suitable solvent such as ethyl acetate. The dip or spray application further includes applying a polyvinylidene chloride solution to the pinchoff end of the tank. This may be dipped or sprayed on the tank by any suitable means. For example, a typical spray gun system or a dipping technique may be implemented.

After dip or spray coating is applied, the fluid tank with the polyvinylidene chloride solution is heated or baked at between about 150° to 220° F. which removes the solvent from the solution, leaving the polyvinylidene chloride on the pinch end and other coated tank surfaces. The heating step is preferably performed for about 5 to 20 minutes. This provides a solid low permeation barrier bridge on the pinchoff end to bridge the pinchoff gap forming a continuous barrier layer. The fuel tank is then cooled at ambient conditions.

Still another means of adhering the low permeation barrier bridge to the pinchoff end includes an edge filament bonding technique or method. Such method includes applying a filament on the pinchoff end. The filament is preferably a co-extruded filament having a barrier material having a barrier material compatible with the low permeation barrier layer. The barrier material is exposed so that it may be applied or disposed on the pinchoff end. This may be accomplished by rolling a strip of the filament substrate onto the pinchoff end with about a 2 pounds per square inch gauge (psig) pressure load. This temporarily allows the filament substrate to temporarily adhere to the pinchoff end of the fuel tank. In this embodiment, the barrier material includes EVOH, nylon, polyvinylidene chloride, and polyvinylidene fluoride. Then, the filament is bonded on the pinchoff end with an energy source to bridge the pinchoff gap and connect the first and second barrier ends for continuity therebetween. This may be accomplished by any suitable energy source including, but not limited to, an infrared laser, a halogen lamp, or a heating gun known in the art. The energy source preferably melts the filament substrate for bonding to the pinchoff end. Then, the fluid tank is cooled at ambient conditions.

If desired, a protective coat may be applied onto the pinchoff end over the low permeation barrier bridge. This typically protects the barrier bridge from moisture and other external forces. Additionally, the protective coat disposed over the barrier bridge may be bonded to the pinchoff end by melting the protective coat onto the pinchoff region of the fuel tank. The pinchoff region may then be "repinched" to flow the protective polymer over the bridge. This provides protection of the barrier bridge from moisture, abrasion, and mechanical shock.

Further aspects, features and advantages of the invention will become apparent from consideration of the following erudite description and the appended claims when taken in connection with the accompanying drawings.

What is claimed is :

1. A low permeation pinchoff connection between first and second formed multilayer walls joined together, the low permeation pinchoff connection comprising:

a continuous inner polymeric layer at a pinchoff end of a pinchoff region between the first and second formed sheets;

an outer polymeric layer in overlying relationship with the continuous inner polymeric layer, the outer polymeric layer tapering at the pinchoff region to first and second outer polymeric ends at the pinchoff end separating the first and second outer polymeric ends;

a low permeation barrier layer disposed between the continuous inner polymeric layer and the outer polymeric layer, the low permeation barrier layer tapering with the outer polymeric layer at the pinchoff region to first and second barrier ends separated at the pinchoff end to define a pinchoff gap, the low permeation barrier layer being exposed at the pinchoff end;

a first adhesive layer disposed between the continuous inner polymeric layer and the low permeation barrier layer;

a second adhesive layer disposed between the low permeation barrier layer and the outer polymeric layer; and a barrier bridge disposed on the pinchoff end to bridge the pinchoff gap, the barrier bridge having material compatible with the low permeation barrier layer to connect the first and second barrier ends for continuity therebetween.

2. The low permeation pinchoff connection of claim 1 further comprising a protective coat disposed on the barrier bridge, the protective coat being made of high density polymer.

3. The low permeation pinchoff connection of claim 1 wherein the pinchoff end is recessed to form a notch thereon to expose the low permeation barrier layer.

4. The low permeation pinchoff connection of claim 1 wherein the low permeation barrier layer includes ethylene-vinyl alcohol, nylon, polyvinylidene chloride, polyvinylidene fluoride, and abcite.

5. The low permeation pinchoff connection of claim 1 wherein the barrier bridge is made of material including ethylene-vinyl alcohol, nylon, polyvinylidene chloride, polyvinylidene fluoride, and abcite.

6. The low permeation pinchoff connection of claim 1 wherein the continuous inner polymeric layer includes high density polyethylene.

7. The low permeation pinchoff connection of claim 1 wherein the outer polymeric layer includes high density polyethylene.

8. The low permeation pinchoff connection of claim 1 wherein the first adhesive layer includes a low density polymer.

9. The low permeation pinchoff connection of claim 1 wherein the second adhesive layer includes a low density polymer.

10. The low permeation pinchoff connection of claim 1 wherein the low permeation barrier layer and the first and second adhesive layers fill the pinchoff gap.

11. A fluid tank having a low permeation pinchoff connection at a pinchoff end of a pinchoff region between first and second formed sheets of the fluid tank for reducing hydrocarbon permeation, the fluid tank comprising:

a continuous inner polymeric layer at a pinchoff end of a pinchoff region between the first and second formed sheets;

an outer polymeric layer formed about the continuous inner polymeric layer, the outer polymeric layer being in overlying relationship with the continuous inner polymeric layer, the outer polymeric layer tapering at the pinchoff region to first and second outer polymeric ends at the pinchoff end separating the first and second outer polymeric ends;

a discontinuous low permeation barrier layer disposed between the continuous inner polymeric layer and the outer polymeric layer, the low permeation barrier layer tapering with the outer polymeric layer at the pinchoff region to first and second barrier ends separated at the pinchoff end to define a pinchoff gap, the low permeation barrier layer being exposed at the pinchoff end;

a first adhesive layer disposed between the continuous inner polymeric layer and the low permeation barrier layer;

a second adhesive layer disposed between the outer polymeric layer and the low permeation barrier layer; and a low permeation barrier bridge disposed on the pinchoff end to bridge the pinchoff gap, the barrier bridge having material compatible with the low permeation barrier layer to connect the first and second barrier ends for continuity therebetween.

12. The fluid tank of claim 11 further comprising a protective coat disposed on the barrier bridge, the protective coat being made of high density polymer.

13. The fluid tank of claim 11 wherein the pinchoff end is recessed to form a notch thereon to expose the low permeation barrier layer.

14. The fluid tank of claim 11 wherein the low permeation barrier layer includes ethylene-vinyl alcohol, nylon, polyvinylidene chloride, polyvinylidene fluoride, and abcite.

15. The fluid tank of claim 11 wherein the barrier bridge is made of material including ethylene-vinyl alcohol, nylon, polyvinylidene chloride, polyvinylidene fluoride, and abcite.

16. The fluid tank of claim 11 wherein the continuous inner polymeric layer includes high density polyethylene.

17. The fluid tank of claim 11 wherein the outer polymeric layer includes high density polyethylene.

18. The fluid tank of claim 11 wherein the first adhesive layer includes a low density polymer.

19. The fluid tank of claim 11 wherein the second adhesive layer includes a low density polymer.

20. The fluid tank of claim 11 wherein the low permeation barrier layer and the first and second adhesive layers fill the pinchoff gap.

* * * * *